US006505159B1

(12) United States Patent
Theodore

(10) Patent No.: US 6,505,159 B1
(45) Date of Patent: Jan. 7, 2003

(54) APPARATUS AND METHOD FOR PROVIDING SPEECH INPUT TO A SPEECH RECOGNITION SYSTEM

(75) Inventor: Stuart Theodore, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/033,812

(22) Filed: Mar. 3, 1998

(51) Int. Cl.[7] .............................................. G10L 21/00
(52) U.S. Cl. ...................... 704/270; 704/275; 704/272; 704/201; 455/550; 455/557; 455/575; 345/179; 345/173
(58) Field of Search ................................ 704/270, 275, 704/224, 225, 272, 276, 201; 455/550, 557, 575; 345/179, 173

(56) References Cited

U.S. PATENT DOCUMENTS

| | | | | |
|---|---|---|---|---|
| 4,837,808 A | | 6/1989 | Immendorfer et al. ........ 379/96 |
| 4,864,623 A | | 9/1989 | Van Nes et al. .............. 381/43 |
| 5,086,385 A | * | 2/1992 | Launey et al. .............. 364/188 |
| 5,111,501 A | | 5/1992 | Shimanuki .................. 379/355 |
| 5,220,595 A | | 6/1993 | Uehara ......................... 379/74 |
| 5,255,341 A | | 10/1993 | Nakajima ...................... 395/2 |
| 5,335,276 A | * | 8/1994 | Thompson et al. ............. 380/21 |
| 5,335,313 A | * | 8/1994 | Douglas ....................... 704/275 |
| 5,349,687 A | * | 9/1994 | Ehlig et al. ................. 395/800 |
| 5,386,494 A | | 1/1995 | White ........................ 395/2.84 |
| 5,420,912 A | | 5/1995 | Kopp et al. .................... 379/63 |
| 5,428,669 A | | 6/1995 | McCarthy ..................... 379/61 |
| 5,450,525 A | | 9/1995 | Russell et al. ............. 395/2.84 |
| 5,526,411 A | * | 6/1996 | Kreiter ........................ 379/110 |
| 5,583,965 A | | 12/1996 | Douma et al. ............. 395/2.84 |
| 5,734,254 A | * | 3/1998 | Stephens ..................... 320/106 |
| 5,774,841 A | * | 6/1998 | Salazar et al. .............. 704/225 |
| 5,873,045 A | * | 2/1999 | Lee et al. .................... 455/550 |
| 6,201,977 B1 | * | 3/2001 | Cathey et al. ............... 455/574 |

FOREIGN PATENT DOCUMENTS

| | | |
|---|---|---|
| WO | WO 91/07835 | 5/1991 |
| WO | WO 93/01664 | 1/1993 |
| WO | WO 95/06938 | 3/1995 |

OTHER PUBLICATIONS

"Method to Pace User Input for Speech Recognition Systems", IBM Technical Disclosure Bulletin, vol. 37, No. 10, Oct. 1, 1994, pp. 575–577.

* cited by examiner

Primary Examiner—Vijay B. Chawan
(74) Attorney, Agent, or Firm—Westman, Champlin & Kelly, P.A.; S. Koehler

(57) ABSTRACT

An apparatus and a method for providing input speech into a computer having a speech recognition system and an input device remote from the computer. The input device includes a microphone, an indicator and a user operated switch. To provide input speech, the user operates the user operated switch wherein an activation signal is transmitted from the input device to the computer. A speech recognition ready signal is then transmitted from the computer to the input device when the speech recognition system is operable to receive input speech. The indicator is actuated upon receipt of the speech recognition ready signal.

35 Claims, 5 Drawing Sheets

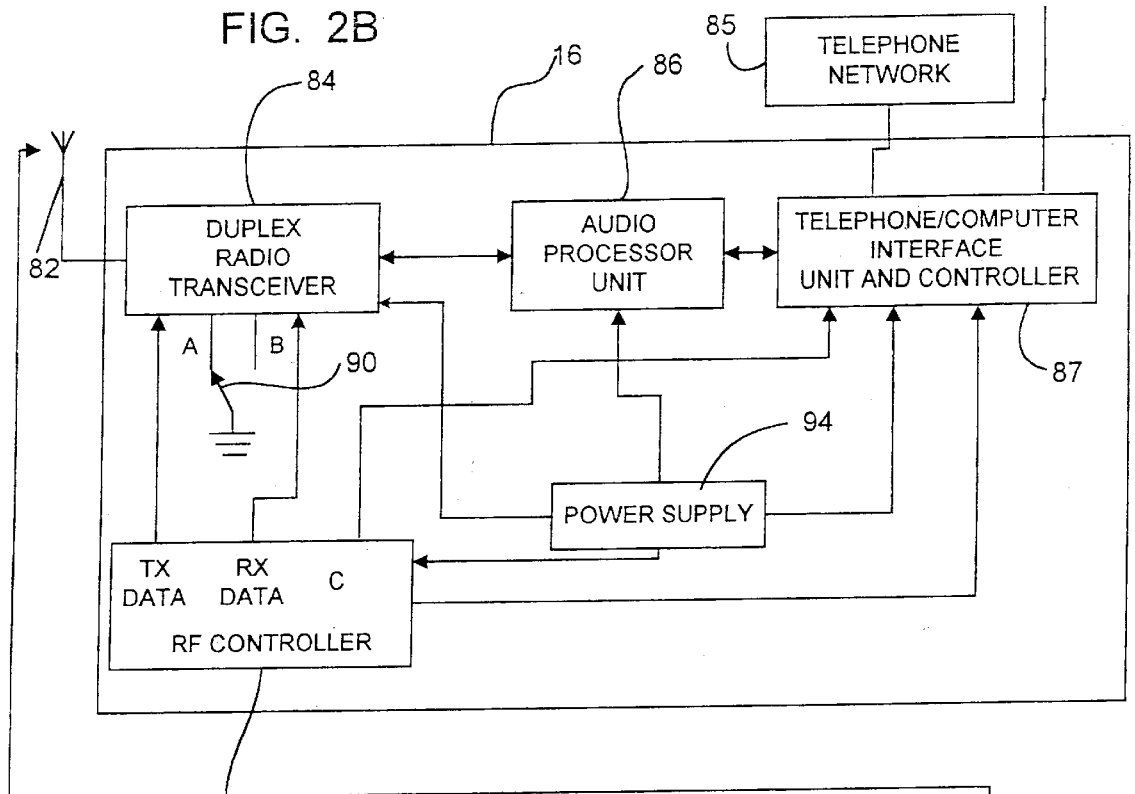
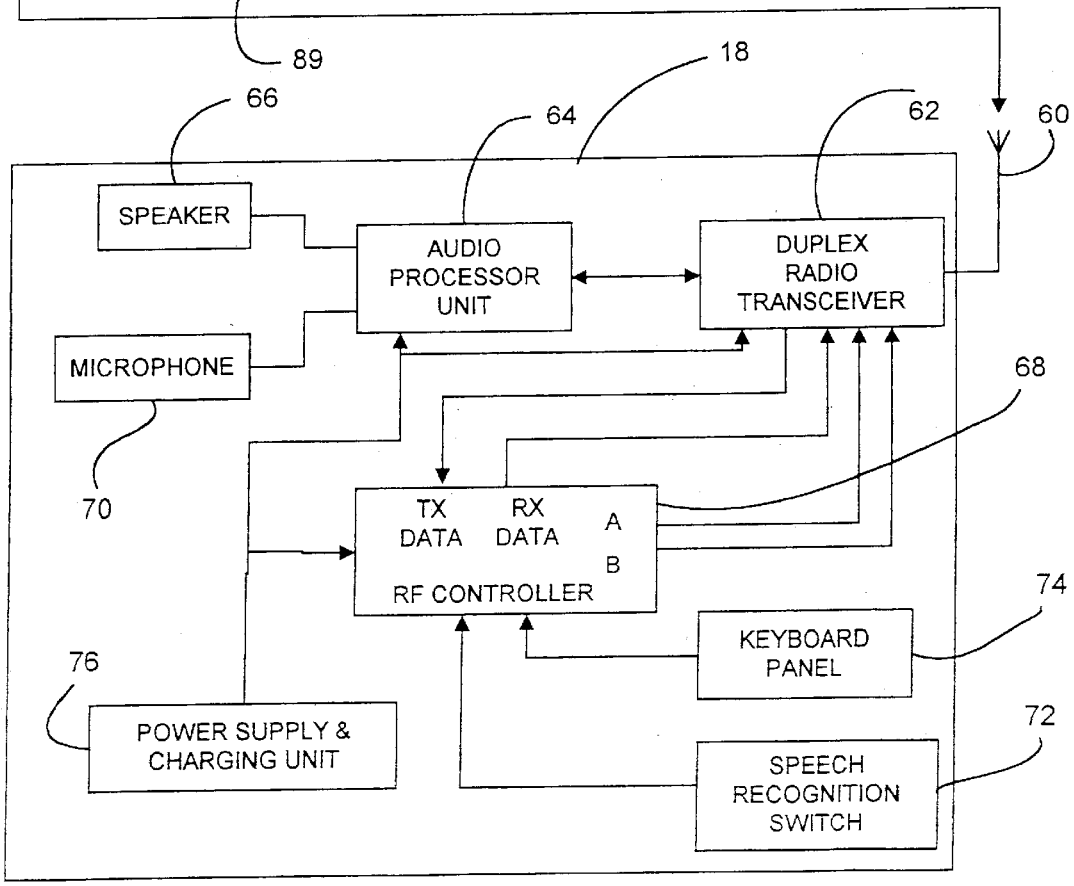

APPARATUS AND METHOD FOR PROVIDING SPEECH INPUT TO A SPEECH RECOGNITION SYSTEM

BACKGROUND OF THE INVENTION

The present invention relates to speech recognition systems. More particularly, the present invention is an apparatus and method for providing speech input into a speech recognition system.

Various input devices have been used in the past for interacting with a computer system. These devices include a keyboard, a mouse, a joystick, all of which require the user to manipulate a physical device in order to perform functions on a computer.

Recently, computers have been designed to recognize and respond to a user's spoken words. In such a system, the computer is equipped with a microphone to which the user speaks. Input speech from the user is analyzed to detect various commands upon which the computer takes subsequent action. This type of interface, in theory, allows hands-free communication with the computer, which can be more efficient and/or user-friendly for some applications.

However, problems are associated with providing spoken instructions to a computer that are not present with other interactive devices, such as a mouse or a keyboard. One of the more significant problems is that the computer should respond only to the user operating the system and not attempt to interpret other spoken words in a surrounding environment. For instance, it is not desirable for the computer to try to interpret other conversations, music, etc., which may be present when the user is not giving instructions to the computer.

Prior art systems and techniques have addressed this problem by requiring the user to use one of the above-mentioned physical interactive devices in cooperation with prompts provided on a visual display screen when voice instructions are given. For instance, the user may be required to depress keys or buttons on the keyboard or mouse to signify to the computer that instructions will be provided. Alternatively, the mouse can be used to position a cursor in a selected area of the screen to signify to the system that voice commands will be provided. However, each of the foregoing techniques requires the user to be present at the computer in order to operate the keyboard or mouse when voice commands are given. This requirement limits the user's mobility, and thus inhibits wide spread use of speech recognition systems.

SUMMARY OF THE INVENTION

An apparatus and a method for providing input speech into a computer having a speech recognition system and an input device remote from the computer. The input device includes a microphone, an indicator and a user operated switch. To provide input speech, the user operates the user operated switch wherein an activation signal is transmitted from the input device to the computer. A speech recognition ready signal is then transmitted from the computer to the input device when the speech recognition system is operable to receive input speech. The indicator is actuated upon receipt of the speech recognition ready signal.

In one embodiment, the input device is a telephone such; as a cordless telephone, conventional telephone or a cellular telephone. The user operated switch can be a keyboard of the telephone or a separate switch remote from the keyboard. A light, a speaker or a buzzer can be used to transmit the speech recognition ready signal to the user.

DETAILED DESCRIPTION OF THE PREFERRED EMBODIMENTS

Figure 1:
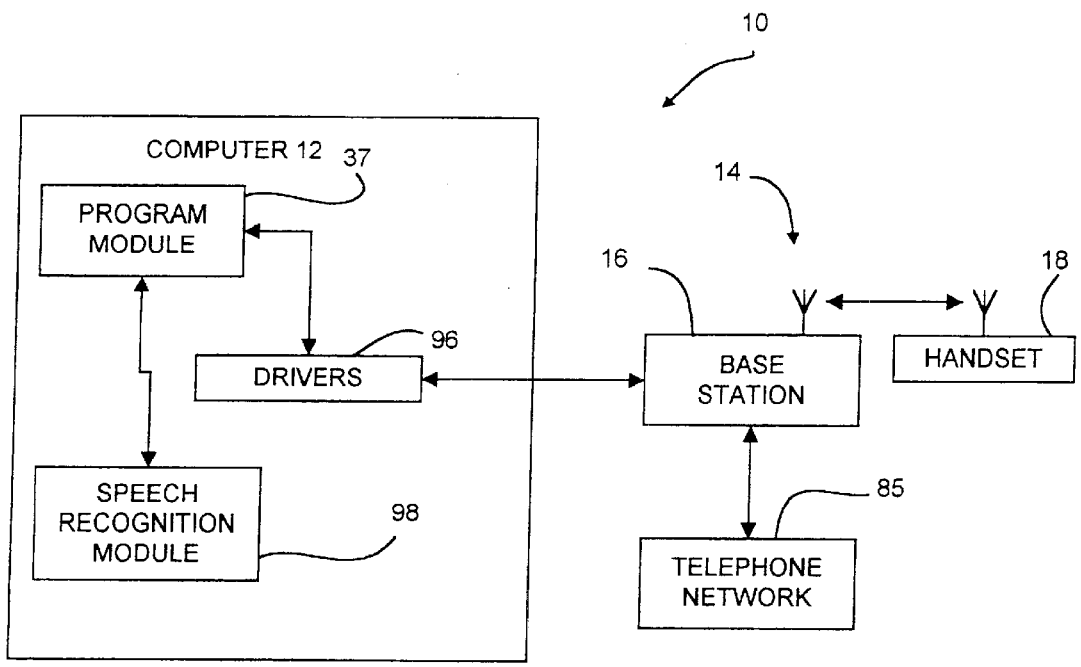
FIG. 1 is a schematic representation of a first embodiment of the present invention.

FIG. 1 schematically illustrates an apparatus 10 in accordance with a first embodiment of the present invention. Generally, the apparatus 10 includes a computer 12 programmed to carry out voice recognition based on voice data produced from sound spoken by a user through an input device 14. In the embodiment illustrated, the input device 14 comprises a cordless telephone having a base station 16 and a portable handset 18 that is operable with the base station 16 in a limited distance or area therefrom. In other words, the handset 18 allows the user to be remote from the computer 12, yet allows the user to remain in contact with the computer 12 through the base station 16 and a suitable communication link, such as a RF link, established between the base station 16 and the handset 18. As used herein, "remote" from the computer shall mean that the user can maintain communication with computer 12 at a position away from the actual site of the computer 12 where typical interactive devices such as a keyboard, a monitor and a speaker are provided and are directly (electrically) connected to the computer 12. In general, the input device 14 allows the user to signal to the computer 12 when input speech is going to be provided while the user is located at a position remote from the computer 12. The input device 14 includes an indicator, such as a speaker, light or buzzer, which, when operated by the computer 12, provides feedback to the user that the computer 12 is now ready to receive input speech.

Figures 2A, 2B:
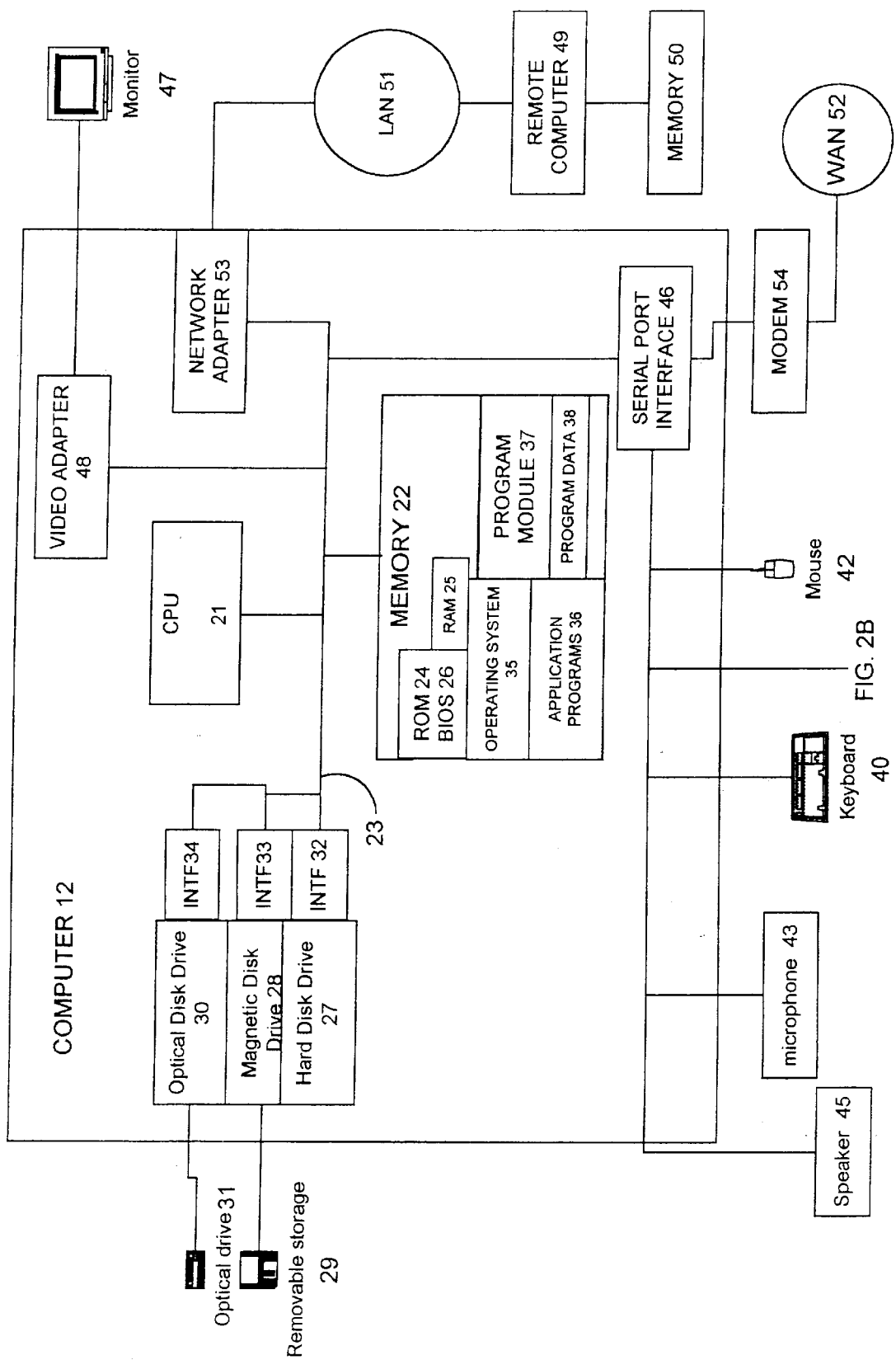
FIGS. 2A and 2B are a block diagram of an exemplary environment for implementing the present invention.

FIGS. 2A and 2B and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 2A, an exemplary system for implementing the invention includes a general purpose computing device in the form of a conventional personal computer 12, including a processing unit 21, a system memory 22, and a system bus 23 that couples various system components including the system memory 22 to the processing unit 21. The system bus 23 can be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 12, such as during start-up, is stored in the ROM 24. The personal computer 12 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, the magnetic disk drive 28, and the optical disk drive 30 are connected to the system bus 23 by a hard disk drive interface 32, a magnetic disk drive interface 33, and an optical disk drive interface 34, respectively. The drives and the associated computer-readable media provide nonvolatile storage of computer readable instructions, data structures, program modules and other data for the personal computer 12.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 12 through devices such as a keyboard 40, a pointing device 42 and a microphone 43 located at the site of the personal computer 12, as well as through the input device 14 (FIG. 2B), discussed in detail below, which allows the user to input speech from a location remote from the computer 12. Other input devices (not shown) can include a joystick, game pad, satellite dish, scanner, or the like. These and other input devices are often connected to the processing unit 21 through a serial port interface 46 that is coupled to the system bus 23, but can be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers can typically include other peripheral output devices, such as a speaker 45 and printers (not shown).

The personal computer 12 can operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 12, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets and the Internet.

When used in a LAN networking environment, the personal computer 12 is connected to the LAN 51 through a network interface or adapter 53. When used in a WAN networking environment, the personal computer 12 typically includes a modem 54 or other means for establishing communications over the WAN 52, such as the Internet. The modem 54, which can be internal or external, is connected to the system bus 23 via the serial port interface 46. In a network environment, program modules depicted relative to the personal computer 12, or portions thereof, may be stored in the remote memory storage devices. It will be appreciated that the network connections shown are exemplary and other means of establishing a communications link between the computers may be used.

FIG. 2B is a simplified illustration of the cordless telephone 14 comprising the base station 16 and the handset 18. The handset 18 receives and transmits RF signals via an antenna 60. The antenna 60 is coupled to a duplex radio transceiver unit 62 which is capable of operation in a receiver mode and in a transmitter mode. In the receiver mode, the transceiver unit 62 applies received and demodulated audio signals to an audio processor unit 64 for amplification and ultimate reproduction in a speaker 66. Also in the receiver mode, the transceiver unit 62 also provides digital data to the "receive data" (i.e., RXdata) terminal of a controller 68, for instance, a HC05 microcontroller sold by Motorola, Inc. of Schaumburg, Ill. In the transmitter mode, the transceiver unit 62 receives audio signals, picked-up (i.e., detected) by a microphone 70 and amplified by the audio processor unit 64, for transmission to the base station 16. Also in the transmitter mode, the transceiver unit 62 receives "transmit data" (i.e., TXdata) from the controller 68, for transmission to the base station 16. The controller 68 is coupled to a keyboard panel 74 for receiving keystroke commands from the user through a plurality of buttons or keys. In the embodiment illustrated, a separate speech recognition switch 72 is also connected to the controller 68. The speech recognition switch 72 is operated when voice instructions are going to be provided as discussed below. The controller 68 also has two output lines A and B for controlling the transceiver unit 62 to operate on a RF communications channel A or on a RF communications channel B. A power supply and charging unit 76 supplies operating power to the circuitry of the handset 18.

Figure 3:
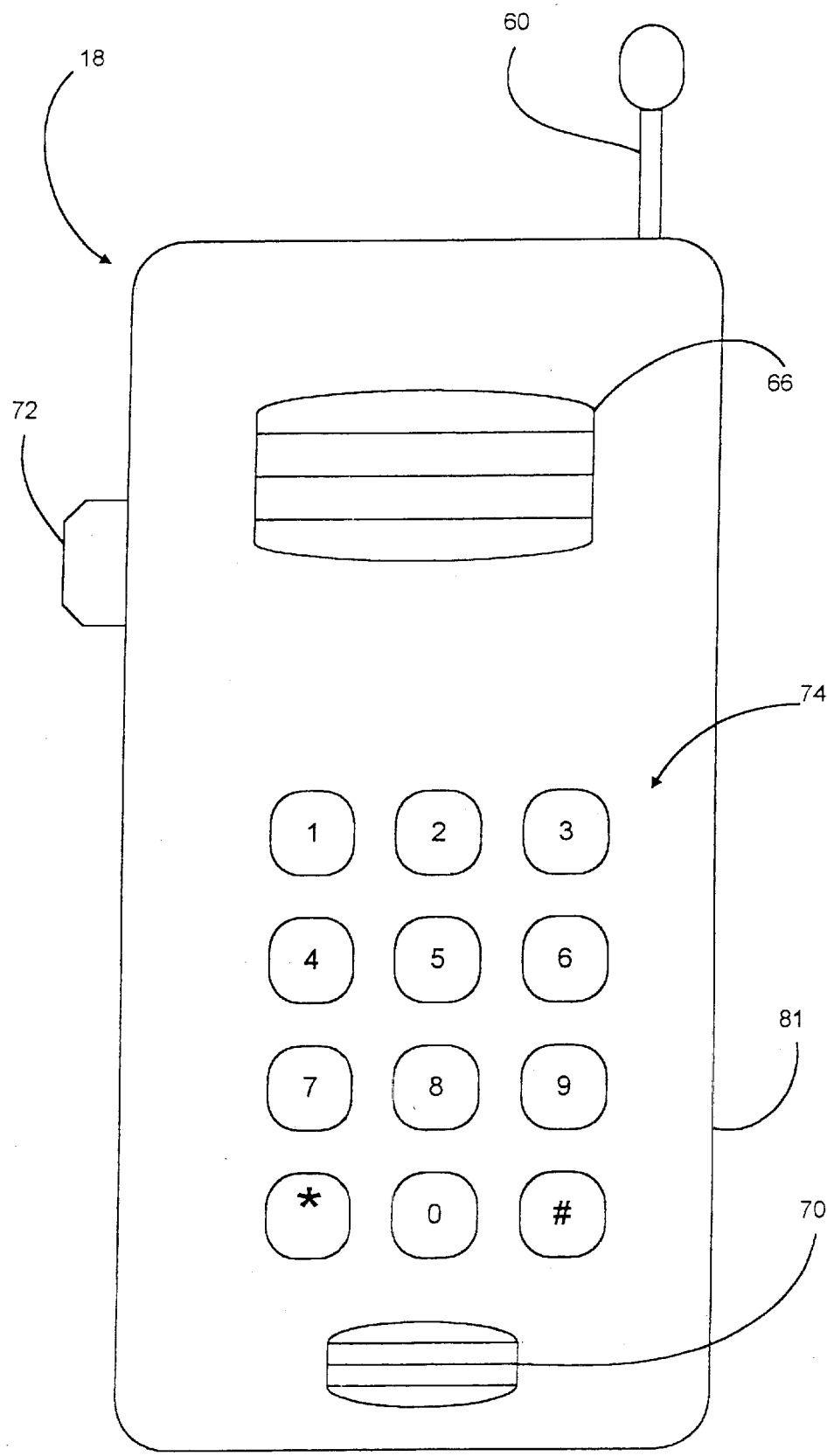
FIG. 3 is a front elevational view of a handset.

FIG. 3 is a front elevational view of an exemplary embodiment of the handset 18. In the embodiment illustrated, the speech recognition switch 72 is located on a side of a housing 81, which allows operation of the switch 72 with the index finger or thumb of the user.

Referring back to FIG. 2B, the base station 16 receives and transmits RF signals via an antenna 82. The antenna 82 is coupled to a duplex radio transceiver unit 84 which is capable of operation in a receiver mode and in a transmitter mode. In the receiver mode, the transceiver unit 84 applies received and demodulated audio signals to an audio processor unit 86 for amplification and coupling to a telephone network 85, or to the personal computer 12 via a telephone/computer interface unit and controller 87. The telephone/computer interface unit and controller 87 is connected to the telephone network via two terminals traditionally known as tip (T) and ring (R). The telephone/computer interface unit and controller 87 is connected to the system bus 23 (FIG. 2A) with a suitable interface unit, not shown, communicating with suitable protocols. In one embodiment, the interface unit and protocol are in accordance with the USB standard.

The USB standard has particular attributes such as increased bandwidth over prior serial communication links, which allows more voice data to be provided to the computer 12 from the input device 14. In addition, the USB standard can allow simultaneous connection of the base station 16 with the telephone network 85 and the personal computer 12, if desired.

In the receiver mode, transceiver unit 84 also provides digital data to the "receive data" (i.e., RXdata) terminal of a controller 89. The controller 89 has a control terminal C by which the telephone/computer interface unit and controller 87 can be controlled to establish communication over the telephone network 85 or the personal computer 12. Suitable microcontrollers for blocks 87 and 89 include the Z8 integrated digital signal processor microcontroller sold by Zilog Inc. of Campbell Calif. and the HC05 microcontroller sold by Motorola, Inc., respectively. In the transmitter mode, the transceiver unit 84 receives signals, conveyed by the telephone network 85, or the personal computer 12 via the telephone/computer interface unit and controller 87 and amplified by the audio processor unit 86, for transmission to the handset 18. Also in transmitter mode, the transceiver unit 84 receives "transmit data" (i.e., TXdata) from the controller 89, for transmission to handset 18. The transceiver unit 84 is coupled to a switch 90 via two input lines A and B, which control the transceiver unit 84 to operate on RF communications channel A or on RF communications channel B. A power supply 94 provides operating power to the circuitry of the base station 16.

Referring back to FIG. 1, the computer 12 generally includes (or can be equipped with) the program module 37, a speech recognition module 98 and suitable drivers (hardware and software) 96 for the input device 14 to communicate with the program module 37 and the speech recognition module 98. The program module 37 can be any number of applications which are to be performed using voice instructions. For example, the program module 37 can be an answering machine residing in the computer 12 wherein operation such as playback of messages, record new messages and transferring messages can be accomplished through voice instructions. In another application, the program module 37 could be a dictation system where commands as well as dictation are provided through speech input. It should be noted that the present invention is not limited to applications performed with a general purpose computer such as the computer 12, but can also be used with other consumer and office electronic devices such as remote machine controllers, TVs, etc. Likewise, the input device 14 need not be a telephone having an associated keyboard panel, but can simply be a handheld voice input device without the capability of operating as telephone.

Figure 4:
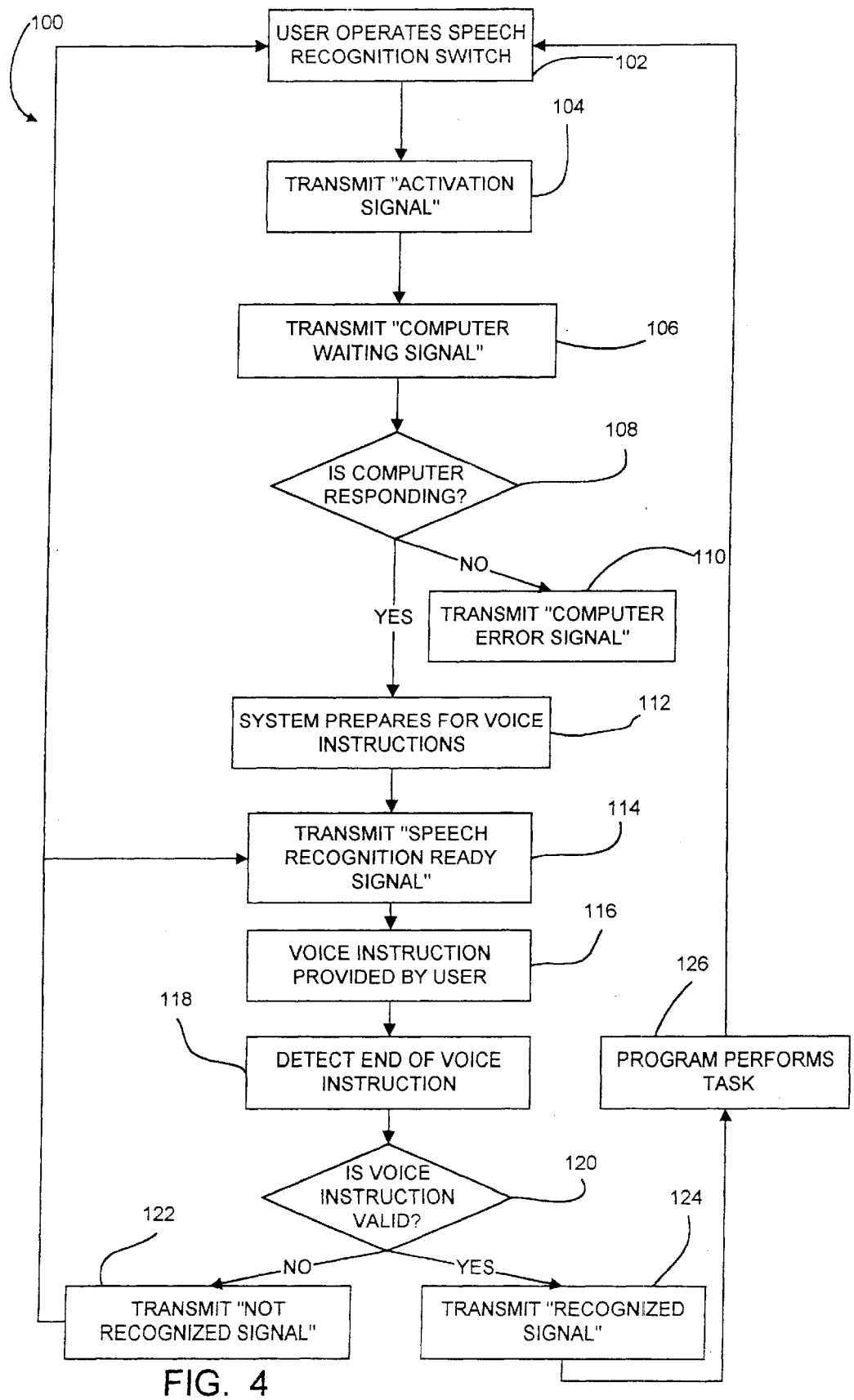
FIG. 4 is a flow diagram illustrating operation of the present invention.

FIG. 4 is a flow diagram illustrating operation of the apparatus 10. Operation begins at step 102 whereat the user operates the speech recognition switch 72 to indicate to the computer 12 that voice instructions are going to be provided. Generally, an "Activation Signal" is then transmitted from the input device 14 to the computer 12 at step 104. The Activation Signal can be an analog or digital signal that is audible or inaudible. In the embodiment illustrated, the Activation Signal originates at the handset 18 and is transmitted to the base station 16. The base station 16 then transmits the Activation Signal to the program module 37 through the drivers 96 to indicate that the user wants to input voice instructions. In one embodiment, the base station 16 also generates and transmits a "Computer Waiting Signal" to the handset 18 at step 106 which is communicated to the user. In the embodiment described, the Computer Waiting Signal initiates an audible tone indicating to the user that the input device 14 is attempting to establish a connection to the computer 12. For example, the computer 12 may be in a "sleep" mode where selected components such as the hard disk drive 27 have been turned off in order to conserve power. In such a case, the Computer Waiting Signal can be transmitted to the user until the computer 12 has become fully operational.

If at step 108, the input device 14 is unable to communicate with the computer 12 and, in particular, the program module 37 and speech recognition module 98, a "Computer Error Signal" is generated at step 110. For instance, the Computer Error Signal can be generated after a preselected time interval if the computer 12 does not respond. In the embodiment illustrated, the base station 16 generates the Computer Error Signal and transmits it to the handset 18. The Computer Error Signal initiates an audible tone to indicate to the user that the computer 12 is not responding.

If the computer 12 is on and the program module 37 is running a program such as an answering machine where voice messages are being played to the user, upon receipt of the Activation Signal provided by the input device 14, the program module 37 suspends current operations, such as playing a recorded message, and prepares the speech recognition module 98 for receipt of subsequent voice instructions at step 112. Preparation of the speech recognition module 98 can include providing a set of allowable voice instructions based upon the current status of the program. The set of allowable voice instructions can be one valid instruction that the program module 37 expects to receive from the user, or one of a number of valid instructions that the program module 37 expects to receive from the user.

After preparation of the speech recognition module 98 at step 112, the program module 37 provides a "Speech Recognition Ready Signal" at step 114 through the input device 14 to the user indicating that the system and, in particular, the speech recognition module 98, are ready to accept voice instructions from the user. In the embodiment illustrated, the Speech Recognition Ready Signal is transmitted from the base station 16 to the handset 18 whereat the Speech Recognition Ready Signal is used to initiate an audible tone recognizable by the user.

The user then enters a voice instruction at step 116. Program flow then continues to step 118 where end event detection is provided. End event detection, or detection of the end of the voice instruction provided at step 116, can be performed using any one of a number of techniques. For instance, release or deactivation of the speech recognition switch 72 is monitored by deactivation of the Activation Signal. Likewise, transmission of another signal corresponding to release of the speech recognition switch 72 can be used to indicate that the voice instructions have been completed. Alternatively, silence can be used as a signal that voice instructions are completed. In one embodiment, silence is presumed when the power level of the signal from the input device 14 has decreased below a selected level. In yet another embodiment, reactivation of the speech recognition switch 72, and subsequent retransmission of the Activation Signal can be used to signify that voice instructions have been completed.

At step 120, the speech recognition module 98 evaluates the input voice instruction against the set of valid instructions. If the voice instruction received from the user does not correspond with any of the expected instructions in the set of valid instructions, program flow continues to step 122 whereat a "Not Recognized Signal" is transmitted to the user indicating that the voice instruction received was not recognized. In the embodiment illustrated, the Not Recognized Signal is generated as a tone and transmitted through the speaker 66 of the handset 18 to the user. System operation can then return to control of the program module 37, where, for example, if prior to step 102 the program was playing a message, the message can be continued to be played. If desired, system operation could alternatively return to step 114 so that another voice instruction can be provided by the user.

If at step 120, the speech recognition module 98 does determine that the received voice instruction corresponds to one of the set of valid voice instructions, the system generates a "Recognized Signal" that is transmitted to the user through the input device 14 at step 124. In the embodiment illustrated, the base station 16 transmits the Recognized Signal to the handset 18 whereat the Recognition Signal is used to initiate an audible tone provided to the user. System operation is then transferred to the program module 37 at step 126 where instructions are provided to components of the computer 12 necessary to complete the task in accordance with the voice instructions received. For example, the computer 12 may open, close or transfer files requested by the user. In another application, the program module 37 may begin recording a message from the user, or play a selected message to the user. At the completion of the task, the system awaits reactivation of the speech recognition switch 72 at step 102 indicating that another voice instruction is to be provided by the user.

At this point, it is worth noting, that other types of indications can be used in addition or in place of the audible tones described above for the Activation Signal, the Speech Recognition Ready Signal, the Computer Error Signal, the Recognized Signal and the Not Recognized Signal. For example, each of these signals can initiate visual indicators such as lights, or tactile indicators such as buzzers. Likewise, a display, such as a liquid crystal display (LCD) can be provided on the input device 14 to display icons or text corresponding to each of the signals. Furthermore, audio message signals, such as "please wait" for the Computer Waiting Signal, "the computer is not responding" for the Computer Error Signal, "speech recognition ready" for the Speech Recognition Ready Signal, "speech input not recognized" for the Not Recognized Signal, or repeating the recognized instruction for the Recognized Signal, can be used in place of or in, addition to the indicators described above.

Figure 5:
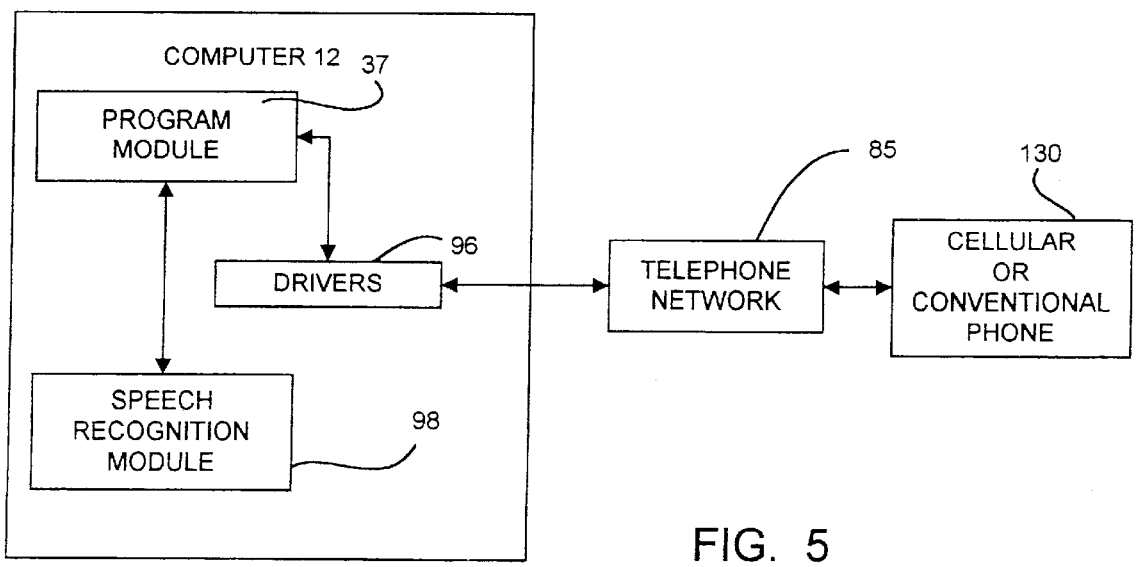
FIG. 5 is a schematic representation of a second embodiment of the present invention.

It is to be understood that other telephones can be used in addition, or in place of, the cordless telephone 14 illustrated in FIGS. 1, 2A and 2B. FIG. 5 illustrates a second embodiment where a cellular telephone or a conventional phone 130, such as a pay phone, comprises the input device 14. In this embodiment, the telephone 130 communicates with the computer 12 remotely through the telephone network 85. In one embodiment, the telephone 130 includes the speech recognition switch 72 separate from the associated keyboard in a manner similar to the handset 18 of the first embodiment. Alternatively, one or a number of keys can be depressed on the keyboard associated with the telephone 130 in place of the separate speech recognition switch 72. Operation of the embodiment of FIG. 5 is in accordance with the flow diagram illustrated in FIG. 4. Transmission of the Activation Signal from the telephone 130 to the computer 12 can be an analog or digital signal that is audible or inaudible. Likewise, transmission of the Speech Recognition Ready Signal, the Computer Error Signal, the Recognized Signal and the Not Recognized Signal, although originating from the computer 12 can be an analog or digital signal that is audible or inaudible. If the signals are inaudible, suitable circuitry is provided in the telephone 130 to generate audible tones, or activate other indicating devices such as lights, buzzers, etc. on the telephone 130.

Although the present invention has been described with reference to preferred embodiments, workers skilled in the art will recognize that changes may be made in form and detail without departing from the spirit and scope of the invention.

What is claimed is:

1. An apparatus for providing speech input into a computer having a speech recognition system, the apparatus comprising:

a portable input device movable to positions remote from the computer, the input device including:
a microphone;
an indicator;
a user operated switch;
a transceiver operably coupled to the microphone, the indicator and the user operated switch, the transceiver transmitting an activation signal from the input device to the computer upon operation of the user operated switch, and receiving a speech recognition ready signal from the speech recognition system to the input device when the speech recognition system is operable to receive input speech, wherein the indicator is actuated upon receipt of the speech recognition ready signal, and wherein the transceiver receives a recognized signal from the computer too the input device if input speech is recognized, and receives a not recognized signal from the computer to the input device if the input speech is not recognized, the indicator being actuated as a function of receipt of the recognized signal or the not recognized signal; and battery for powering the transceiver.

2. The apparatus of claim 1 wherein the input device checks the operational status of the speech recognition system and actuates the indicator if the speech recognition system is not operational.

3. The apparatus of claim 1 wherein the input device comprises a telephone having a keyboard for initiating a call to a second telephone through a telephone network.

4. The apparatus of claim 3 wherein the keyboard includes the user operated switch.

5. The apparatus of claim 3 wherein the keyboard is remote from the user operated switch.

6. The apparatus of claim 3 wherein the telephone comprises a cellular phone.

7. The apparatus of claim 3 wherein the telephone comprises a base station connectable to the computer and a handset operable with the base station within a limited distance of the base station, the handset including the microphone and the indicator.

8. The apparatus of claim 3 wherein the indicator comprises a speaker and wherein audible tones are generated by the speaker as a function of receipt of the speech recognition ready signal, recognized signal and the not recognized signal.

9. The apparatus of claim 3 wherein the indicator comprises a speaker and wherein audible tones are generated by the speaker as a function of receipt of the speech recognition ready signal, recognized signal and the not recognized signal.

10. The apparatus of claim 1 wherein the indicator comprises a speaker.

11. The apparatus of claim 1 wherein the indicator comprises a light.

12. A method for providing input into a speech recognition system, the method comprising the steps of:
providing a portable input device movable to positions remote from the speech recognition system, the input device including a microphone, an indicator and a user operated switch operably coupled to a transceiver, and a battery for powering the transceiver;
transmitting an activation signal from the input device to the speech recognition system upon operation of the user operated switch;
transmitting a speech recognition ready signal from the speech recognition system to the input device when the speech recognition system is operable to receive input speech;
operating the indicator upon receipt of the speech recognition ready signal to indicate to a user that the speech recognition system is operable to receive input speech;
transmitting input speech from the input device to the speech recognition system after activation of the indicator;
analyzing the input speech;
transmitting a recognized signal from the speech recognition system to the input device if the input speech was recognized, or transmitting a not recognized signal from the speech recognition system to the input device if the input speech was not recognized; and
operating the indicator as a function of receipt of the recognized signal or the not recognized signal.

13. The method of claim 11 and further comprising the step of preparing the speech recognition system for input prior to the step of transmitting the speech recognition ready signal.

14. The method of claim 13 wherein the step of preparing includes providing a set of valid input speech to the speech recognition system.

15. The method of claim 11 and further comprising the steps of:
checking the operational status of the speech recognition system; and
transmitting an error signal to a user via the input device if the speech recognition system is not operational.

16. The method of claim 15 wherein the step of operating the indicator comprises operating the indicator as a function of receipt of the speech recognition ready signal or the error signal.

17. The method of claim 11 wherein the input device comprises a telephone having input means for inputting a sequence of symbols to initiate connection of the telephone to a second telephone through a telephone network.

18. The method of claim 17 wherein the input means includes the user operated switch.

19. The method of claim 17 wherein the input means is remote from the user operated switch.

20. The method of claim 17 wherein the telephone is remote from the speech recognition system, and the method includes connecting the telephone to the speech recognition system through a telephone network.

21. The method of claim 20 wherein the telephone comprises a cellular phone.

22. The method of claim 17 wherein the telephone comprises a base station connected to the speech recognition system and a handset operable with the base station within a limited distance of the base station, the handset including the microphone and the indicator.

23. The method of claim 17 wherein the indicator comprises a speaker and the step of operating includes generating an audible tone as a function of receipt of the speech recognition ready signal, the recognized signal or the not recognized signal.

24. An apparatus for providing speech input into a computer having a speech recognition system, the apparatus comprising:
a portable input device movable to positions remote from the computer, the input device including a microphone, an indicator and a user operated switch;
means for transmitting an activation signal from the input device to the computer upon operation of the user operated switch, and transmitting a speech recognition ready signal from the, speech recognition system to the input device when the speech recognition system is operable to receive input speech, wherein the indicator is actuated upon receipt of the speech recognition ready signal, and wherein the means for transmitting transmits a recognized signal from the computer to the input device if input speech is recognized, and transmits a not recognized signal from the computer to the input device if the input speech is not recognized, the indicator being actuated as a function of receipt of the recognized signal or the not recognized signal; and
a battery for powering the means for transmitting.

25. The apparatus of claim 24 and wherein the computer provides a set of valid input speech to the speech recognition system.

26. The apparatus of claim 24 wherein the input device checks the operational status of the speech recognition system and transmits an error signal to a user if the speech recognition system is not operational.

27. The apparatus of claim 26 wherein transmission of the error signal comprises operating the indicator as a function of receipt of the speech recognition ready signal and the error signal.

28. The apparatus of claim 26 wherein the indicator comprises a speaker and wherein audible tones are generated by the speaker as a function of receipt of the speech recognition ready signal, the error signal, the recognized signal and the not recognized signal.

29. The apparatus of claim 24 wherein the input device comprises a telephone having a keyboard for initiating a call to a second telephone through a telephone network.

30. The apparatus of claim 29 wherein the keyboard includes the user operated switch.

31. The apparatus of claim 29 wherein the keyboard is remote from the user operated switch.

32. The apparatus of claim 29 wherein the telephone comprises a cellular phone.

33. The apparatus of claim 29 wherein the telephone comprises a base station connected to the computer and a handset operable with the base station within a limited distance of the base station, the handset including the microphone and the indicator.

34. The apparatus of claim 24 wherein the indicator comprises a speaker.

35. The apparatus of claim 24 wherein the indicator comprises a light.

* * * * *

UNITED STATES PATENT AND TRADEMARK OFFICE
CERTIFICATE OF CORRECTION

PATENT NO. : 6,505,159 B1
DATED : January 7, 2003
INVENTOR(S) : Theodore

It is certified that error appears in the above-identified patent and that said Letters Patent is hereby corrected as shown below:

Column 1,
Line 64, delete ";".

Column 7,
Line 46, delete ";".

Column 8,
Line 30, replace "too" with -- to --.
Line 46, insert -- a -- before "battery".

Column 9,
Lines 32 and 39, replace "11" with -- 12 --.

Column 10,
Line 18, delete ",".

Signed and Sealed this

Thirteenth Day of July, 2004

JON W. DUDAS
*Acting Director of the United States Patent and Trademark Office*